(12) United States Patent
Petri Ortega et al.

(10) Patent No.: US 10,443,571 B2
(45) Date of Patent: Oct. 15, 2019

(54) KIT FOR A WIND STATION, AND METHOD

(71) Applicant: INGETEAM POWER TECHNOLOGY, S.A., Zamudio (Vizcaya) (ES)

(72) Inventors: Alberto Petri Ortega, Sarriguren (ES); Carlos Girones Remirez, Sarriguren (ES); Jesus Mayor Lusarreta, Sarriguren (ES)

(73) Assignee: INGETEAM POWER TECHNOLOGY, S.A., Zamudio, (Vizcaya) (ES)

( * ) Notice: Subject to any disclaimer, the term of this patent is extended or adjusted under 35 U.S.C. 154(b) by 0 days.

(21) Appl. No.: 15/320,388

(22) PCT Filed: Oct. 16, 2014

(86) PCT No.: PCT/ES2014/070783
§ 371 (c)(1),
(2) Date: Dec. 20, 2016

(87) PCT Pub. No.: WO2016/059263
PCT Pub. Date: Apr. 21, 2016

(65) Prior Publication Data
US 2017/0198681 A1 Jul. 13, 2017

(51) Int. Cl.
*F03D 9/25* (2016.01)
*F03D 7/02* (2006.01)
*H02K 7/18* (2006.01)

(52) U.S. Cl.
CPC .......... *F03D 9/255* (2017.02); *F03D 7/0276* (2013.01); *H02K 7/183* (2013.01); *F05B 2230/80* (2013.01); *Y02E 10/725* (2013.01)

(58) Field of Classification Search
CPC ....... F03D 9/255; F03D 7/0276; H02K 7/183; F05B 2230/80; Y02E 10/72
(Continued)

(56) References Cited

U.S. PATENT DOCUMENTS 5,083,039 A 1/1992 Richardson et al.
7,081,689 B2 * 7/2006 Tilscher ................ F03D 7/0284
290/44
(Continued)

FOREIGN PATENT DOCUMENTS

DE 101 17 212 A1 10/2002
EP 1 426 616 B1 7/2006
(Continued)

OTHER PUBLICATIONS

Chris S. Brune et al., "Experimental Evaluation of a Variable-Speed, Doubly-Fed Wind-Power Generation System", IEEE Transactions on Industry Applications, May / Jun. 1994, pp. 648-654, vol. 30, No. 3.
(Continued)

*Primary Examiner* — Charles Reid, Jr.
(74) *Attorney, Agent, or Firm* — Sughrue Mion, PLLC

(57) ABSTRACT

A kit for a wind station having a fixed speed wind turbine with a generator configured to be coupled to a grid by a coupling device so that the turbine operates at a fixed frequency equal to the frequency of the grid. The kit includes a back-to-back power converter configured for connection between the generator and the grid, and the power converter includes a machine side converter, a grid side converter and a DC link between both converters, a controller for controlling the power converter, and a connection point for receiving at least one parameter of the generator of the turbine. The connection point is communicated with the controller, and the controller is configured to act upon the power controller depending on said parameter.

17 Claims, 5 Drawing Sheets

(58) Field of Classification Search
USPC .......................................................... 290/44
See application file for complete search history.

(56) References Cited

U.S. PATENT DOCUMENTS

| | | | |
|---|---|---|---|
| 2008/0088131 A1* | 4/2008 | Thisted | H02J 3/38 |
| | | | 290/44 |
| 2010/0109328 A1* | 5/2010 | Li | H02M 7/53875 |
| | | | 290/44 |
| 2010/0142237 A1* | 6/2010 | Yuan | H02J 3/386 |
| | | | 363/97 |
| 2010/0230966 A1 | 9/2010 | Pavlak | |
| 2011/0089693 A1* | 4/2011 | Nasiri | F03D 7/0272 |
| | | | 290/44 |
| 2013/0134709 A1 | 5/2013 | Eitan et al. | |
| 2013/0147194 A1* | 6/2013 | Mayor Lusarreta | H02P 9/007 |
| | | | 290/44 |

FOREIGN PATENT DOCUMENTS

| | | |
|---|---|---|
| ES | 2 252 444 T3 | 5/2006 |
| ES | 2 357 422 T3 | 4/2011 |
| WO | 2004/025823 A1 | 3/2004 |

OTHER PUBLICATIONS

International Search Report of PCT/ES2014/070783 dated Jun. 30, 2015 [PCT/ISA/210].
Written Opinion of PCT/ES2014/070783 dated Jun. 30, 2015 [PCT/ISA/237].

\* cited by examiner

KIT FOR A WIND STATION, AND METHOD

CROSS REFERENCE TO RELATED APPLICATIONS

This application is a National Stage of International Application No. PCT/ES2014/070783, filed Oct. 16, 2014, the contents of which are incorporated herein by reference in its entirety.

TECHNICAL FIELD

The present invention relates to a kit for a wind station, and more particularly to a kit for a wind station comprising a fixed speed wind turbine.

PRIOR ART

In recent years the number of wind turbines and wind farms connected to the power grid has experienced a notable increase. The first wind turbines installed were fixed-speed turbines which were coupled to the power grid. Said wind turbines include a generator 310 with its stator coupled to the grid 302, and some additional subsystems to allow the turbine 1 to operate in conditions required by grid operators, such as a reactive power compensation device (normally capacitor banks 390) and/or a soft starter 380, as shown in FIG. 1 by way of example. The first ones, capacitor banks 390, are required in order to provide the reactive power that the induction generator consumes for its magnetization, since it cannot be consumed from the grid because of grid code requirements in force in almost all countries. The second ones, soft starters 380, are necessary to start up the wind turbine, since the generator 310 cannot be directly coupled to the grid. Instead of a soft starter 380 another coupling device for fulfilling the same function could also be used. The rotational speed of the wind turbine must be the one corresponding to the grid voltage frequency, and when said condition is reached, the wind turbine is coupled to the grid 302 by means of the soft starter 380 that allows controlling the inrush currents. The capacitor banks 390 and soft starter 380 can be controlled or supervised by a PLC (Programmable Logic Controller) not shown in the Figures.

A fixed speed wind turbine can also include further subsystems 370 such as a gear box, a squirrel cage induction generator control, a pitch control system, and/or a control system for the yaw of the turbine for example, as shown in FIG. 2, that can also be controlled or supervised by a PLC.

One drawback of fixed speed wind turbines is that the inertia and the stiffness of the mechanical transmission system (gear box, etc.) could cause vibrations that are excited by wind sudden changes or turbulences, and because of the inability to work at variable speed, these vibrations are transmitted to the electrical grid as power fluctuations. A way to diminish these oscillations is providing the wind turbine the capability to work at a wider range of speed, getting a more flexible coupling between the generator and the electrical grid. This way, it is possible to absorb the wind gusts, reducing torque strokes and delivering a more stable power to the grid. Alternatively, or additionally, the mechanical parts of the wind turbines can be designed to support vibrations (up to a certain level), and if said level of vibrations is achieved the wind turbine is disconnected from the grid.

In addition, in the present days the technical requirements that apply to wind turbines are becoming more and more demanding in fields such as grid connection and power quality. A clear example of this trend towards more efficient and reliable systems is the vertiginous increase of grid code requirements in terms of fault ride through (FRT), harmonic content (power quality) and steady state active and reactive power generation. Different International grid codes are requiring more and more demanding operating conditions. The fixed speed wind turbines require the installation of extra equipment in order to be able to maintain the power production and to fulfil the reactive power production requirements while grid faults. In order to overcome this drawback some fixed speed systems have been provided with different types of devices to fulfil FRT requirements without disconnecting the wind turbine from the grid, and to ensure reactive current injection requirements.

Another drawback of fixed speed wind turbines is that, due to the generator frequency must be equal to the frequency of the grid, said wind turbine is coupled to the grid only when said condition is achieved, this fact affecting the availability of the fixed speed wind turbines, and consequently to its efficiency.

In document EP1426616A1 a wind power station comprising a fixed speed wind turbine is disclosed. The station comprises an extra equipment (an upgrade kit) comprising a converter device connected between the generator and the grid to operate the generator with a variable generator current frequency deviating from the grid current frequency in a wind power range below the 50% of the rated power of the generator. Once the 50% of the rated power is reached, the upgrade kit is decoupled and the generator is directly coupled to the grid.

DISCLOSURE OF THE INVENTION

The object of the invention is to provide a kit for a wind station comprising a fixed speed wind turbine coupled to a grid by means of a coupling device, and a method for turning the fixed speed wind turbine into a variable speed wind turbine.

The wind power station comprises a fixed speed wind turbine with a generator being coupled to a grid by means of a coupling device in order to operate at a fixed frequency, said fixed frequency being equal to the frequency of the grid. The generator comprises a stator and a rotor, and the frequency of the generator is directly related to the rotational speed of the rotor, said rotational speed depending on the speed of the wind that acts on the wind turbine.

A first aspect of the invention refers to a kit adapted to be coupled between the generator of the wind turbine and the grid, replacing at least the coupling device, the kit turning the fixed speed wind turbine into a variable speed wind turbine, such that the generator remains coupled to the grid and providing power to said grid irrespective of the generator's frequency which depends on the wind conditions (in the wind conditions in which a variable speed wind turbine can operate, normally between approximately 4 m/s wind speed and approximately 25 m/s wind speed), the availability of the wind turbine being increased.

In contrast to the prior art, where in order to increase the availability of a fixed speed turbine an extra equipment (an upgrade kit) is installed in the station to help said fixed speed turbine to deal with the moments where the generator frequency deviating from the grid frequency, the kit of the invention has been designed to replace at least the coupling device. Therefore, the invention proposes to turn said fixed speed turbine into a variable speed turbine, the advantages of a variable speed wind turbine in respect of a fixed speed wind turbine being so achieved, instead of causing the fixed speed turbine to be disconnected to the grid when the generator current frequency is deviated from the grid current frequency (particularly in a wind power range below the associated nominal power range of the generator). Additionally, as the kit turns the fixed speed turbine into a variable speed turbine there is no need to incorporate extra equipment, which would involve the cost to be increased, for fulfilling FRT requirements and for increasing the efficiency and availability of the turbine.

A second aspect of the invention refers to a method for turning a fixed speed wind turbine into a variable speed wind turbine, in which the coupling device is placed with a kit according to the first aspect of the invention. Therefore, the wind turbine comprises the advantages of a variable speed wind turbine in an easy way.

These and other advantages and features of the invention will become evident in view of the drawings and the detailed description of the invention.

DETAILED DISCLOSURE OF THE INVENTION

Figure 1:
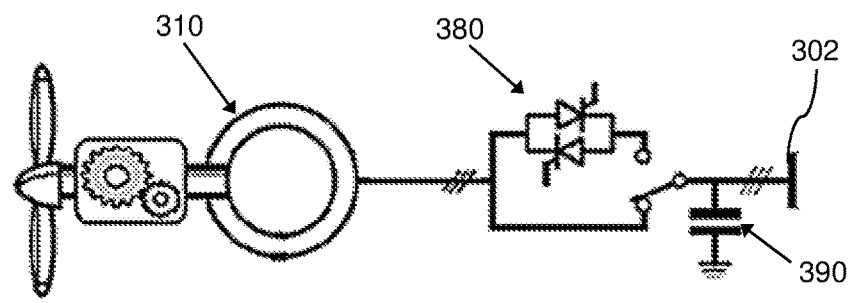
FIG. 1 schematically shows a conventional wind station comprising a fixed speed wind turbine, a soft starter and a reactive power compensation device.
Figure 2:
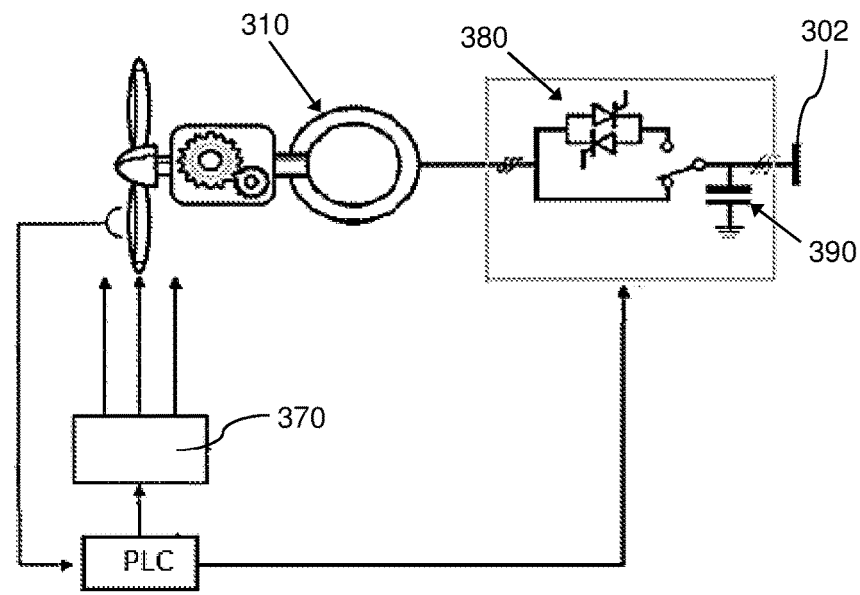
FIG. 2 shows the wind station of FIG. 1, including further subsystems for controlling the pitch and/or the yaw of the turbine.

The kit 100 of the invention is adapted for a wind station comprising a fixed speed wind turbine 1 to be coupled to a grid 2 by means of a coupling device, such as a soft starter for example. The wind turbine 1 comprises a generator 10 with a rotor 12 and a stator 11 for being coupled to the grid 2 by means of the coupling device, in order to operate with a fixed frequency equal to the frequency of said grid 2. The frequency of the generator 10 is directly related to the rotational speed of the rotor 12, said rotational speed depending on the speed of the wind that acts on the wind turbine 1.

Figure 3:
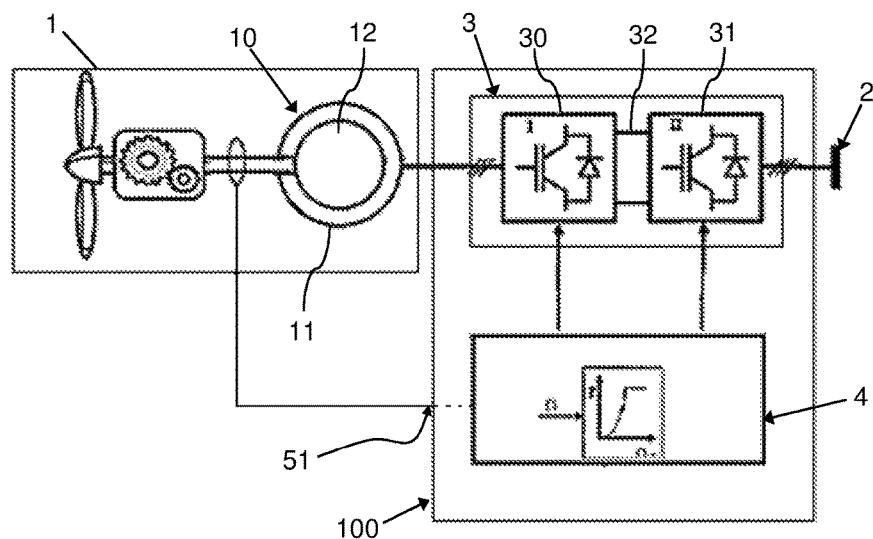
FIG. 3 shows an embodiment of the kit of the invention installed in a wind station comprising a wind turbine, coupled between a wind turbine and a grid.
Figure 4:
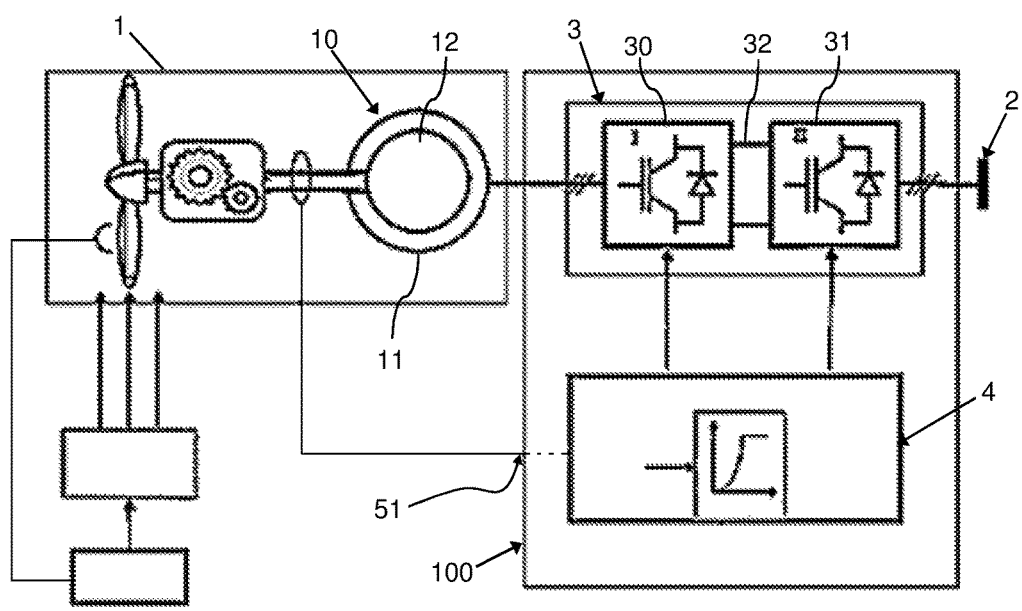
FIG. 4 shows an embodiment of the kit of the invention installed in a wind station comprising a wind turbine and subsystems for controlling the pitch and/or yaw of the wind turbine, coupled between a wind turbine and a grid.

The kit 100 of the invention replaces at least the coupling device, and it is coupled between the generator 10 of the wind turbine 1 and the grid 2 as shown by way of example in FIGS. 3 and 4. Therefore, the fixed speed turbine is turned into a variable speed turbine, at least the advantages of a variable speed wind turbine in respect of a fixed speed wind turbine being achieved. For example:

Wind gusts do not produce torque strokes in the mechanical system of the wind turbine 1, the life time of the wind turbines 1 being increased. The energy caused by the gusts is stored mechanical inertia of the turbine creating an "elasticity" that reduces torque pulsations, and electrical power variations are eliminated.

It allows to more easily fulfilling the grid code requirements, which trend towards more efficient and reliable systems in terms of fault ride through, harmonic content (power quality supplied to the grid 2) and steady state active and reactive power generation.

In addition no reactive power compensation devices (normally capacitor banks) are required in order to provide the reactive power that the generator 10 consumes for its magnetization. In this way, in the fixed speed wind turbines comprising reactive power compensation devices said reactive power compensation devices can also be removed, the kit 100 replacing the coupling device and the reactive power compensation devices.

The kit 100 comprises a power converter 3, of the type knows as back-to-back, connectable between the generator 10 and the grid 2, a controller 4 for controlling the power converter 3 and a connection point 51 for receiving at least one parameter of the generator 10, the connection point 51 being communicated with the controller 4, such that the controller 4 controls the power converter 3 depending on said parameter. Preferably said parameter is the rotational speed of the rotor 12 of the generator 10.

The controller 4 autonomously controls the power converter 3, such that the kit 100 can be coupled to a fixed speed wind turbine of any topology (including different subsystems and/or control structures) to turn it into a variable speed wind turbine, without requiring any further modification in the turbine 1 for getting it (it is enough with the dismantling of the coupling device, and of the reactive power compensation devices if any, and with the coupling of the kit 100).

The controller 4 is configured to act upon the power controller 3 to adapt the resistant torque to be applied to the turbine 1 depending on said parameter, in order to absorb the maximum power from the wind, so that the wind turbine 1 can operate as a variable speed wind turbine. Due to the wind acting on the turbine 1, the generator 10 of the turbine 1 (the rotor 12) rotates at a specific speed depending on the speed of said wind, a so-called motor torque being generated by the generator 10 due to said rotation, so that if the motor torque increases the turbine 1 (the generator 10) accelerates, and if said motor torque decreases the turbine 1 (the generator 10) slows down.

It is known that in a variable speed wind turbine a resistant torque is also present. Said resistant torque depends on the current through the rotor 12 and/or stator 11 of the generator 10 (on the electromagnetic field generated by the generator 10 when rotates), and is associated to the motor torque according to the following equation:

$$C_m - C_r = J(dw/dt),$$

wherein:
$C_m$: motor torque,
$C_r$: resistant torque,
J: Inertia (constant depending on the wind turbine drive train),
w: rotational speed of the rotor 12.

Therefore, a change in the motor torque implies also a change in the resistant torque.

With the kit 100 coupled to the turbine 1, when the speed of the wind changes the rotational speed of the turbine 1 also changes, the motor torque being consequently changed. The controller 4 is configured to act on the power converter 3 depending on the rotational speed of the turbine 1 (on the speed of the rotor 12 of the generator 10) in order to change the resistant torque so that the maximum power absorption in respect of the new wind speed is achieved.

Therefore, the controller 4 is configured to calculate the resistant torque versus speed variation characteristics of the generator 10 of the wind turbine 1 to which said power converter 3 is connected, said characteristic associating the resistant torque with the rotational speed of the rotor 12 of the generator 10 of the turbine 1 (this association is known in the field). Each specific wind turbine 1 comprises its own torque versus speed variation characteristic, so that said information is previously stored in the kit 100, in particular in a memory (not shown in Figures) of said kit 100. Preferably the memory is an internal memory of the controller 4.

According to said characteristic associating the resistant torque with the rotational speed of the rotor 12 of the generator 10 of the turbine 1, at each rotational speed an optimum resistant torque allows to absorb the maximum power from the wind, and the controller 4 is configured to act on the power converter 3 to adjust the resistant torque in order to get the optimum resistant torque in each moment.

Figure 5:
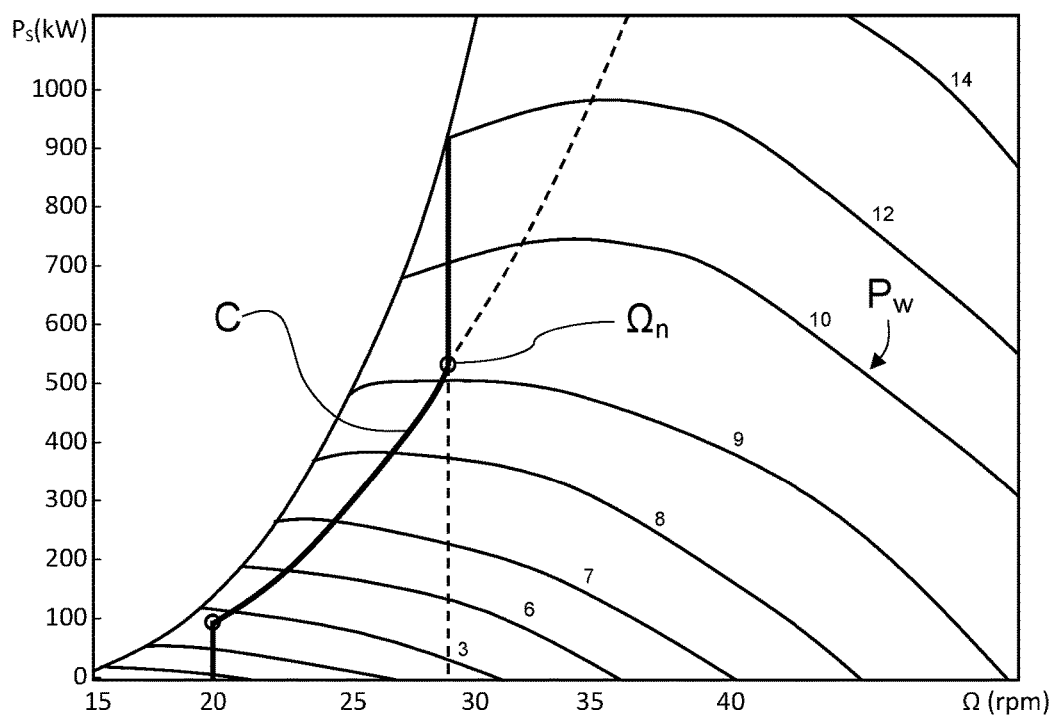
FIG. 5 shows the association between the resistant torque and the rotational speed of the rotor of the generator of a wind turbine.
Figure 6:
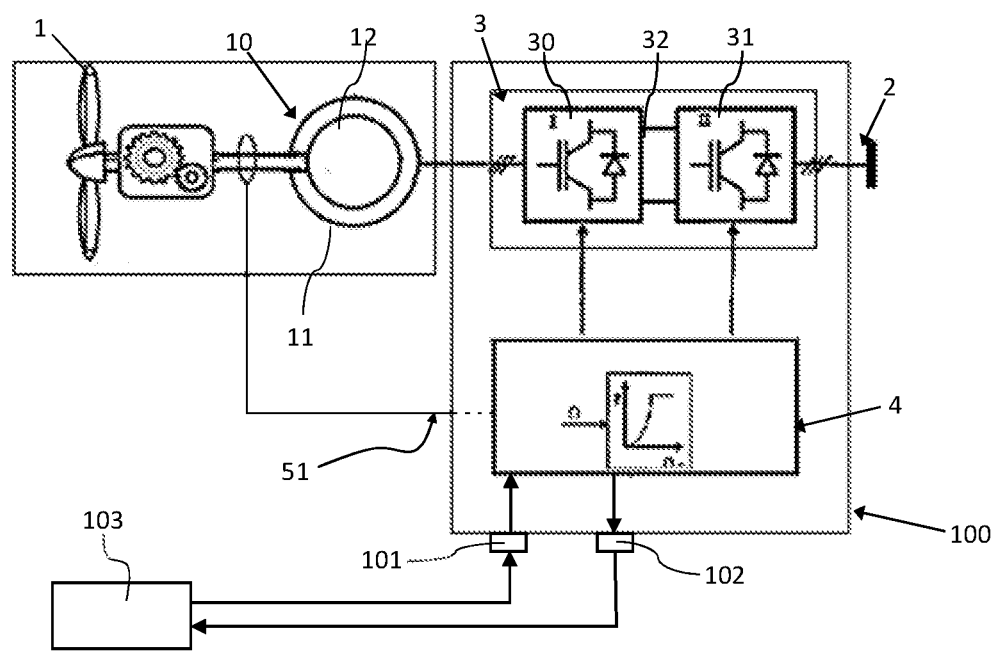
FIG. 6 shows the embodiment of FIG. 3 having a second external controller.
Figure 7:
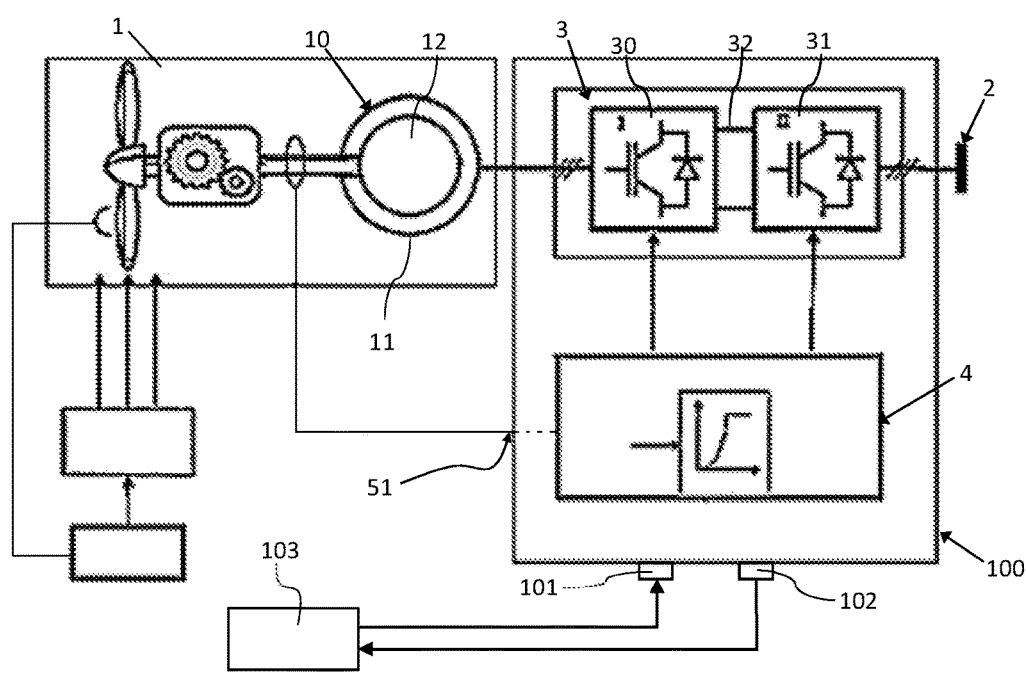
FIG. 7 shows the embodiment FIG. 4 having a second external controller.

The resistant torque versus rotational speed variation characteristics are normally represented by a curve as shown by way of example in FIG. 5, where:
 Ps=stator power (the power that can be absorbed by the wind turbine 1),
 Ω=rotational speed of the rotor 12 of the generator 10,
 Ω=nominal rotational speed of the rotor 12 of the generator 10,
 C=curve representing the optimum resistant torque in each situation, and
 Pw=power able to be absorbed from the wind for each wins speed depending on the rotational speed.

Through said curve it is possible to associate the resistant torque with the rotational speed of the turbine 1 (the optimum resistant torque for each rotational speed of the turbine 1), the controller 4 calculating the characteristic which associates the resistant torque with the rotational speed of the generator 10 of the wind turbine 1.

The power converter 3 comprises a machine side converter 30, a grid side converter 31 and a DC link 32 between both converters 30 and 31. In a first embodiment of the invention shown by way of example in FIGS. 3 and 4, the machine side converter 30 is connected to the stator 11 of the generator 10 and the grid side converter 31 is connected to the grid 2. Said configuration is also known as full-converter. In a second embodiment of the invention not shown in figures, the machine side converter 30 is connected to the rotor 12 of the generator 10 and the grid side converter 31 is connected to the grid 2. Said configuration is also known as doubly-fed inductor generator (DFIG).

The power converter 3 comprises a machine side converter 30, a grid side converter 31 and a DC link 32 between both converters 30 y 31. In a first embodiment of the invention shown by way of example in FIGS. 3 and 4, the machine side converter 30 is connected to the stator 11 of the generator 10 and the grid side converter 31 is connected to the grid 2. Said configuration is also known as full-converter. In a second embodiment of the invention not shown in figures, the machine side converter 30 is connected to the rotor 12 of the generator 10 and the grid side converter 31 is connected to the grid 2. Said configuration is also known as doubly-fed inductor generator (DFIG).

The power converter 3 is configured to operate the generator 10 in all operative wind ranges, the controller 4 being able to control said power converter 3 in such conditions. In other words, the power converter 3 is configured to operate the generator 10 in all the wind conditions in which a conventional variable speed wind turbine can operate. Said conditions are, normally, between approximately 4 m/s wind speed and approximately 25 m/s wind speed.

The controller 4 of the kit 100 is also configured to calculate the active power or resistant torque and reactive power set points of the generator 10 of the wind turbine 1, depending of the wind conditions (in particular, from the rotational speed of the rotor 12 received), and to use said set points to control the power converter 3.

The kit 100 can also comprise an input connection 101 for receiving set point values from an external second controller 103, as the power factor required for the grid for example, and/or an output connection 102 for transmitting status signals to the second controller 103, such as operating state (emergency, run, pause, etc.), active and reactive power generation, temperature, wind speed or others. The second controller 103 can be a PLC present in the station itself, or a controller remote to the station.

The invention claimed is:

1. A kit for a wind station having a fixed speed wind turbine having only one generator configured to be coupled to a grid by a coupling device so that the turbine operates at a fixed frequency equal to a frequency of the grid, the kit comprising:
 a back-to-back power converter configured for connection between the only one generator and the grid, the power converter comprising a machine side converter, a grid side converter and a DC link between both converters;
 a controller for controlling the power converter; and
 a connection point for receiving at least one parameter of the generator of the turbine, the connection point being communicated with the controller and the controller being configured to act upon the power converter depending on said parameter,
 wherein the kit is configured to be coupled between the generator of the wind turbine and the grid, replacing at least the coupling device, the generator no longer being connected directly to the grid once the kit is so coupled, the machine side converter of the power converter of the kit being connected to a stator or a rotor of the generator and the grid side converter of said power converter connected to the grid,
 the kit turning the fixed speed wind turbine into a variable speed wind turbine.

2. The kit according to claim 1, wherein the controller is configured to act upon the power converter to adapt resistant torque to be applied depending on said parameter.

3. The kit according to claim 2, wherein the controller is configured to act on the power converter depending on a rotational speed of the rotor of the generator of the turbine in order to change the resistant torque.

4. The kit according to claim 3, wherein the controller is configured to autonomously control the power converter, said controller configured to calculate the resistant torque in relation to a speed variation characteristic of the generator, said speed variation characteristic associating the resistant torque with the rotational speed of the rotor of the generator of the turbine.

5. The kit according to claim 4, wherein the controller is configured to control the power converter depending on the rotational speed of the rotor of the generator and on the resistant torque versus speed variation characteristic of said rotor in order to change the resistant torque, to cause said resistant torque to equal an optimum resistant torque associated with the rotational speed of the rotor obtained from said characteristic, and absorb maximum power from the wind irrespective of wind speed changes.

6. The kit according to claim 3, comprising a memory where the relationship between the torque and the rotational speed of the rotor of the generator are stored.

7. The kit according to claim 6, wherein the memory is an internal memory of the controller.

8. The kit according to claim 2, wherein the machine side converter is connected to a stator of the generator and the grid side converter is connected to the grid.

9. The kit according to claim 2, wherein the machine side converter is connected to a rotor of the generator and the grid side converter is connected to the grid.

10. The kit according to claim 2, wherein the power converter is configured to operate the generator in all operative wind ranges of a variable speed wind turbine.

11. The kit according to claim 10, wherein the power converter is configured to operate the generator in all wind ranges between 4 m/s and 25 m/s.

12. The kit according to claim 2, further comprising an input connection for receiving set point values of at least active power, torque and reactive power set points for the generator from an external second controller.

13. The kit according to claim 12, further comprising an output connection for transmitting status signals to the second controller.

14. A method for turning the fixed speed wind turbine into a variable speed wind turbine, the fixed speed wind turbine comprising the generator being coupled to the grid by means of the coupling device so that the fixed speed wind turbine operates at the fixed frequency equal to the frequency of the grid, the method comprising the step of replacing at least the coupling device with the kit according to claim 2.

15. The kit according to claim 1, wherein the power converter is configured to operate the generator in all operative wind ranges of a variable speed wind turbine.

16. A method for turning the fixed speed wind turbine into a variable speed wind turbine, the fixed speed wind turbine comprising the generator being coupled to the grid by means of the coupling device so that the fixed speed wind turbine operates at the fixed frequency equal to the frequency of the grid, the method comprising the step of replacing at least the coupling device with the kit according to claim 1.

17. A wind station, comprising:
a fixed speed wind turbine with a generator configured to be coupled to a grid by a coupling device, the fixed speed wind turbine configured to operate at a fixed frequency equal to a frequency of the grid; and
a kit means for replacing the coupling device to couple the generator of the wind turbine and the grid, and causing the fixed speed wind turbine to operate as a variable speed wind turbine.

* * * * *